United States Patent Office 3,590,116
Patented June 29, 1971

3,590,116
ANTIGEN FOR HEMAGGLUTINATION INHIBITION TEST
Peter H. Matisheck and Thomas J. Langpap, Charles City, Iowa, assignors to Salsbury Laboratories
No Drawing. Filed Feb. 7, 1968, Ser. No. 703,553
Int. Cl. G01n 33/16
U.S. Cl. 424—12      3 Claims

ABSTRACT OF THE DISCLOSURE

A diagnostic reagent for avian mycoplasmosis. The reagent is a non-infective, sensitive, and stable hemagglutination inhibition antigen in solid, standardized, and easily reconstitutable form. It is prepared from a *Mycoplasma gallisepticum* culture which is inactivated with a bactericide incapable of inducing protein denaturation, standardized to a predetermined titer and lyophilized.

---

This invention relates to an antigen for use in the Hemagglutination Inhibition (HI) test for avian mycoplasmosis.

Avian mycoplasmosis is a bacterial infection which is widely prevalent in chicken and turkey flocks. It may degenerate into chronic respiratory disease, but is also in itself a pathological condition which causes inefficiency in feed conversion, inhibition of normal growth, a decline in productivity in laying hens and a general downgrading of the meat quality of the afflicted birds. In its progressive stage the disease produces a clouding of the air sacs and other lesions which upon detection in the packing plant will incur a mandatory rejection of the carcasses.

Unless early discovered, checked and treated, mycoplasmosis is therefore a serious economic threat to the poultry industry. Management of this disabling infection has been attempted in three different ways. Treatment with antibiotics such as tetracycline or tylosin has a limited effect. It is costly and in addition is liable to develop bacterial resistance with ensuing unresponsiveness of the birds to further medication. The second alternative is vaccination, which can be effected only by means of live cultures. This method, however, is conducive to severe reactions in the animals under aggravated conditions of general exposure of the flock. The only reliable control against spread and transmission of mycoplasmosis currently consists in the process of elimination by segregating the carriers from the healthy birds and hatching their uninfected eggs in isolation to produce a clean flock. This procedure requires a safe, dependable and readily available diagnostic reagent which permits a rapid serological test for the presence of *Mycoplasma gallisepticum*. It is the production and use of such an antigen to which this application addresses itself.

In serodiagnosis, specific antigens and antibodies react with each other to prevent agglutination of blood cells while in the absence of antibodies in the serum the red blood cells will clump. The behavior of the blood cells suspension in contact with a sepcific antigen in a serous fluid is therefore an indicator of the presence or absence of antibodies, and reflects the infective or non-infective condition of the suspected specimen. Since microparasites produce antibodies in the serum of infected hosts, the unaltered appearance of blood cells in the presence of a specific antigen exposes the tested bird as a carrier.

Previously known spot checks for mycoplasmosis are based on the principle that a phenol-killed culture of *Mycoplasma* bacteria will agglutinate when mixed with the antibody containing serum of an infected animal. No blood cell indicator is here involved in the test which may be conducted either on a plate or in a tube. The latter operates in a greater dilution, but takes a longer time for a reading since it requires an incubation period of approximately 18 hours. These methods, however, have the shortcoming of being supersensitive so that a positive reading may frequently be deceptive. The supersensitivity of the test is due to the high concentration of the cultured organisms in the plate- or tube-produced antigen as compared with the highly dilute 4 and 8 unit antigen suspensions used in the hemagglutination inhibition test. In fact, the concentration of the antigen is set deliberately at a level just below that at which it would undergo spontaneous agglutination without the presence of the serum. In order to assure the requite equilibrium critical conditions of pH and salt chances of a misleading result. Tube and plate tests, however, are helpful for a pre-screening examination in that the specimens found to be positive are reasonable prospects for a corroborative diagnosis by the hemagglutination inhibition test.

The advantage of the HI test lies in its high but dependable sensitivity permitting the unequivocal recognition not only of the presence of infection but also its type and severity. This is explained by the fact that there exists a quantitative relationship between the HA titer of the antigen culture and the incidence of the inhibition phenomenon. This quantitative relationship is measured in hemagglutination units (HAU). The titer of one HAU expresses the minimum concentration or the reciprocal maximum dilution of antigen which will induce complete hemagglutination of 0.5 ml. of a 0.25% red blood cell suspension, as determined in accordance with the standard reading method established by the U.S.D.A., Agri. Res. Serv., Animal Health Div., revised March 1966, for testing avian sera for the presence of *Mycoplasma gallisepticum* antibodies. For practical purposes 4 HAU's usually contained in 0.5 ml. are used in the test.

In its technical application test sera from suspected birds are placed in tubes and diluted in varying proportions from 1:20 to 1:160. Each tube also contains 4 HAU's of antigen. Equal amounts of a standard red blood cell suspension are added to each of the tubes which are incubated for 60–75 minutes. The hemagglutination titer is then read. The titer of the antiserum tested is the reciprocal value of the last dilution showing complete flocculation of the blood cells. In accordance with the standards of the Department of Agriculture, a serum HI titer of 1:80 or greater is considered a positive reading when a 4-HAU antigen is used. An HI titer of 1:40 or less is inconclusive and requires additional sampling and observation of the flock.

To facilitate the hemagglutination inhibition testing procedure on a routine basis it is essential for the poultry raiser to be provided with an antigen in solid form of standardized sensitivity which has titer stability, a prolonged shelf life, and can be readily reconstituted in aqueous suspensions of a sharply determinate titer for convenient use.

We have found that such an antigen can be prepared by culturing a *Mycoplasma gallisepticum* organism in an appropriate medium, destroying its virulence with a bactericidal agent which has no precipitating or denaturing effect upon its protein components, and thereupon lyophilizing the inactivated culture in a high vacuum. In order to ensure an operative and effective antigen preparation, it is therefore of particular importance to avoid the use of inactivating agent which when in immediate contact with the bacterial culture would modify the same so as to interfere with the coagulation reaction between the Mycoplasma organisms and the red blood cells. An example of such as unsuitable bactericide is Formalin. It was also surprising to discover that lyophilization of a properly inactivated culture does not cause irreversible denaturation and cause hardening of its protein constituents. Such an antigen cannot be reconstituted to a homogeneous suspension and is therefore unfit for the intended purpose.

To further illustrate our invention the following example will serve to describe in greater detail the best mode of producing the antigen and using the same in the hemagglutination inhibition reaction.

EXAMPLE

The organism used in this example was *Mycoplasma gallisepticum*, strain A 5969 which was received from the Animal Disease Eradication Division of the U.S. Department of Agriculture and is further described by Tourtellotte et al. in Ann. N.Y. Acad. Sci., vol. 79 (1960), 521–530. The culture medium was prepared in the following manner. A solution I was formulated containing Brain heart infusion (Difco Labs.)—37.000 g.
Yeast autolysate (Albimi Labs.)—5.000 g.
Thiamine—0.005 g.
Thallium acetate—0.100 g.
Distilled water—700 ml.

The foregoing quantities were based on 1 liter of culture and must be increased for larger production batches. The solution was sterilized in an autoclave.

A separate solution II was prepared from the following ingredients.

Dextrose—3 g.
Tris-hydroxymethylaminoethane—3 g.
Heat inactivated horse serum—100 ml.
Penicillin—100,000 units.

This solution was filter sterilized and aseptically added to solution I, the final pH being adjusted to 8.0.

The sterile culture medium was thereupon inoculated with egg yolk sac material infected with *Mycoplasma gallisepticum*. In a repeat experiment it was found that a 1% inoculum of an established culture of the organism in the log phase growth can be used with equally advantageous results. After an incubation at about 37° C. for 24–56 hours the culture reached the maximum degree of turbidity at which time the organisms were harvested. To this end the culture was treated in a Sharples Continuous Flow Supercentrifuge to paste-form consistency. The paste was aseptically suspended in a sterile 0.15 molar Sorenson buffer solution of $Na_2HPO_4$ and $KH_2PO_4$ adjusted to a pH of $7.0\pm0.1$ containing 0.1 to 0.2% of sodium ethylmercurithiosalicylate, also known in the trade as Thimerosal, as inactivating and preserving agent. The strength of the suspension was brought to 20% cell paste by weight.

While Thimerosal was used with most beneficial results we have found that n-alkyl dimethylbenzyl ammonium chlorides in a concentration of 1:1000 may likewise be employed as culture killing and preserving agents. Among the preferred quaternary ammonium compounds of this type the n-dodecyl-, n-tetradecyl-, cetyl-, and n-octadecyl dimethyl benzyl ammonium chlorides have been used with great advantage. In addition, sodium-hypochlorite in a strength of 20 parts per million and phenol in a concentration of 0.25% in a 0.07 M phosphate buffer solution with a pH of 7.0 may be utilized with satisfactory effects. As previously indicated any chemical compound is serviceable as an inactivator of the culture that is not a protein precipitant and will not cause its denaturation so that it cannot be redissolved to the predetermined titer after a reasonable shelf life for use in the test.

Fractions of the 20% stock suspension were further diluted to 3, 4, 5, 6, and 7% strength and these dilutions were titrated against standard blood cells to determine the hemagglutination unit of the antigen. The concentration testing 40 hemagglutination units per 0.5 ml. by these titrations was selected as the percentage from which the stock suspension for antigen production was prepared. It should be understood, however, that the strength of 40 HA units per 0.5 ml. was chosen for practical reasons, only, in view of the volume limitations and is in no way restrictive of the process of this invention.

After standardization of the batch the antigen was dispensed into 10 ml. vials for lyophilization. To this effect the vials containing the suspension were rapidly frozen to a temperature of at least —50° F. The antigen was thereupon subjected to high vacuum lyophilization for 18–36 hours. The stoppers were then inserted under vacuum and metal caps were crimped over the vial crowns.

For diagnostic use the suspension is reconstituted by adding a volume of sterile water equal to the volume of antigen placed in the vial prior to lyophilization. The reconstituted antigen will thus contain at least 40 HA units per 0.5 ml. In some instances it may be expedient to prepare and bottle a double strength antigen containing 80 hemagglutination units per 0.5 ml. The antigen is reconstituted with sterile water.

In the test the antigen with a titer of 40 HA units per 0.5 ml. is made into suspensions containing 8 to 4 units. This is accomplished by diluting the concentrate respectively in ratios of 1:30 and 1:60. For each sample of serum to be tested a series of 5 tubes are placed in a test tube rack. The first tube is charged with 0.9 ml. of a buffered saline solution and 0.1 ml. of the test sample. The second tube is filled with 0.5 ml. of the 8-unit antigen solution while tubes 3, 4, and 5 each receive 0.5 ml. of the 4-unit antigen.

0.5 ml. are now withdrawn from each preceding and transferred to each successive tube which will give serial serum dilutions of 1:10, 1:20, 1:40, 1:80, and 1:160. The tubes are allowed to stand for about 10 minutes and then mixed with 0.5 ml. of a 0.25% washed red blood cell suspension. After a one-hour incubation at room temperature the tests can be read. The titer of the serum is the reciprocal value of the last dilution showing a complete agglutination of the blood cells.

What we claim is:
1. A process for preparing an antigen for use in hemagglutination tests for avian mycoplasmosis comprising the steps of:
   (a) innoculating a sterile appropriate culture medium with the *Mycoplasma gallisepticum* organism;
   (b) incubating the inoculated medium at about 37° C. for 24 to 36 hours;
   (c) centrifuging the incubated medium to a paste-form consistency;
   (d) suspending the paste in a buffered sterile solution containing an inactivating agent selected from the group consisting of sodium ethylmercurithiosalicylate, n-dimethylbenzylammonium chloride, sodium hypochlorite, and phenol to form a stock suspension; and
   (e) standardizing the suspension to obtain a concentration containing at least 40 hemagglutination units per 0.5 ml.

2. A process in accordance with claim 1, wherein said standardized suspension is lyophilized to a solid, reconstitutable form.

3. An antigen capable of reacting with avian mycoplasmosis antibodies to prevent agglutination of blood cells obtained from poultry afflicted with avian mycoplasmosis, and capable of clumping blood cells obtained from poultry non-infected with the disease after one hour of incubation at room temperature, said antigen containing an inactivated strain of *Mycoplasma gallisepticum* developed by the process of claim 2.

References Cited

Vardaman: Chem. Abst., vol. 66, 1967, page 92590f.

SAM ROSEN, Primary Examiner

U.S. Cl. X.R.

424—88, 92